(12) United States Patent
Morriston

(10) Patent No.: US 6,924,320 B2
(45) Date of Patent: Aug. 2, 2005

(54) DRY LIQUID CONCENTRATE COMPOSITION

(76) Inventor: James C. Morriston, 114 Woodside Dr., McMurray, PA (US) 15317

( * ) Notice: Subject to any disclaimer, the term of this patent is extended or adjusted under 35 U.S.C. 154(b) by 84 days.

(21) Appl. No.: 10/242,053

(22) Filed: Sep. 12, 2002

(65) Prior Publication Data

US 2003/0078327 A1 Apr. 24, 2003

Related U.S. Application Data

(60) Provisional application No. 60/322,355, filed on Sep. 12, 2001.

(51) Int. Cl.[7] .......................... C08J 11/06; C08K 5/1515
(52) U.S. Cl. .......................... 521/40.5; 521/41; 524/114
(58) Field of Search .......................... 521/40.5, 41, 21; 524/114, 40.5

(56) References Cited

U.S. PATENT DOCUMENTS 5,488,080 A * 1/1996 Osborn ....................... 524/270
5,604,277 A * 2/1997 Osborn ....................... 524/270

OTHER PUBLICATIONS

Polymer Science Dictionary, Second Edition, Mark Alger, Chapman & Hall, p. 506.*

* cited by examiner

Primary Examiner—Peter Szekely
(74) Attorney, Agent, or Firm—Polly D. Heseman

(57) ABSTRACT

A dry liquid concentrate composition is disclosed having at least about 40% by weight of a polypropylene copolymer, at least about 10% by weight of santoprene, at least about 11% by weight of a low density polyethylene, at least about 0.5% by weight of a tall oil, at least about 0.5% by weight of a mixture of saturated and unsaturated fatty esters having modified organic acid derivatives, at least about 0.5% by weight of silicone, and at least about 20% by weight of a dry crumb rubber.

3 Claims, No Drawings

DRY LIQUID CONCENTRATE COMPOSITION

CROSS-REFERENCES TO RELATED APPLICATION

This application claims the benefit of U.S. Provisional Application Ser. No. 60/322,355 filed on Sep. 12, 2001, entitled PLASTIC AND RUBBER BONDING.

TECHNICAL FIELD

The present invention relates to the utilization of post-vulcanized elastomers with commercial thermoplastics. Common rubbers for the invention include but are not limited to, natural rubber, styrene butadiene rubber, neoprene, isoprene, nitro, butyl, and ethylenepropylenediene rubbers ("EPDM"). In all cases the rubbers are in a post vulcanized condition, with a common source being scrap tire carcasses, which have been further processed by either ambient or cryogenic grinding yielding a product known in the art as crumb rubber. The crumb rubber used in the present invention functions as a viscoelastic modifier to the thermoplastics increasing flex modulus, elasticity, impact resistance, and resistance to abrasion. Thermoplastics useful in the invention include but are not limited to polypropylene, polyethylene, including the classes known as metallocene and ethylene-vinyl acetate copolymer ("EVA").

BACKGROUND OF THE INVENTION

It is well known in the prior art that vulcanized rubber has a high coefficient of friction. The present invention utilizes lubricants and high temperature dispergents to improve the distribution of the crumb rubber to the polymer matrix, usually at 200° F. to 550° F. along with improving the fluidity and processibilty of the overall compound. The dispergents cover the surface of the crumb rubber, due to their low viscosity and the processing temperature; they enable easy separation of the particles of crumb rubber and aid in the mixing with plastic material. Common dispergents/lubricants/process/aides/antifoaming agents useful to the present invention include but are not limited to polar lubricants or process aides, such as tall oil, antifoaming agents such as silicone, and dispergents such as calcium stearate.

Tall oils include fatty acids and rosin acids in total over 80% by weight, with the rest being tall oil pitches. Fatty acids have long aliphatic chains and very polar carboxyl groups. These carboxyl group can make strong interactions with the polar spots on the surface of the crumb rubber. The polar spots are the filler particles such as carbon black, silica or other fillers that are used in the tire production. The long aliphatic chain has a similar structure to polyethylene and polypropylene and can interact with those matrixes extremely well. Tall oil helps improve dispersion of the crumb rubber. Also, due to the amphiphilic structure (contains polar and non-polar sides) tall oil improves interconnection between the crumb rubber and plastic matrix. Tall oil can be considered to be a coupling agent. Thus, lubricants such as tall oil are coupling agents used in order to improve the bonds between filler (rubber) and polymer matrix (plastic).

The present invention goes well beyond the prior art in expanding lubricants such as tall oil, fatty acids, and by-products of tall oil production. The present invention's viscoelastic modifying affects function with both amorphous and crystalline thermoplastic groups. Of special use in the present invention is the thermoplastic group known as polyolefins.

The present invention provides for the use of crumb rubber in combination with lubricants (polar and nonpolar), polyolefins and other organic compounds and with a coupling agent, such as maleinated polyethylene. Metallocene is also almost always used with this combination.

SUMMARY OF THE INVENTION

The present invention eliminates the above-mentioned needs for a dry liquid concentrate by providing a dry liquid concentrate having in combination, lubricants (polar and nonpolar), polyolefins and other organic compounds, and a coupling agent.

In accordance with the present invention, there is provided a dry liquid concentrate composition having at least about 40% by weight of a polypropylene copolymer, at least about 10% by weigh of Santoprene™, at least about 11% by weight of a low density polyethylene, at least about 0.5% by weight of a tall oil, at least about 0.5% by weight of a mixture of saturated and unsaturated fatty esters having modified organic acid derivatives, at least about 0.5% by weight of silicone, and at least about 20% by weight of a dry crumb rubber. Polypropylene/ethylene-propylene terpolymer blend in which the rubber is crosslinked in the presence of the polypropylene is sold under the trade name Santoprene™. "Polymer Science Dictionary", Second Edition, Mark Alger, printed Chapman & Hall, page 506 for Santoprene. Ethylene-propylene-diene terpolymer (EPDM) is commonly known as ethylene-propylene terpolymer.

The present invention is further directed to a dry liquid concentrate composition having at least about 20% by weight of a crumb rubber blended with at least about 5% by weight of a metallocene ethylene-olefin copolymer, at least about 2% by weight of a maleinated polyethylene, at least about 1% by weight of a tall oil, at least about 1% by weight of a mixture of saturated and unsaturated fatty esters having modified organic acid derivatives, at least about 0.5% by weight of silicone, and at least about 10% by weight of dipropyleneglycol dibenzoate, and at least about 50% by weight of ethylene butylenes styrene added to said crumb rubber blend.

The present invention is additionally directed to a dry liquid concentrate composition having a crumb rubber blended with a maleinated polyethylene, a flame retardant, a flame retardant synergist, an ultraviolet light stabilizer, and a heat stabilizer, a tall oil added to the crumb rubber blend, a mixture of saturated and unsaturated fatty esters having modified organic acid derivatives added to the crumb rubber blend, a stiffener added to the crumb rubber blend, a metallocene ethylene-olefin copolymer added to the crumb rubber blend, and a polypropylene homopolymer added to the crumb rubber blend.

DETAILED DESCRIPTION OF THE PREFERRED EMBODIMENT

One sample of the invention was produced to pass a cold weather impact specification of 120 in-lbs at −29° C. after a 24 hour freezing holding time. To create this sample, plastic pellets consisting of 43% by weight of the overall final mixture copolymer polypropylene, 11% santoprene, and 11% low density polyethylene were blended and combined with 2% (by weight) Polybond 3200 (maleinated polyethylene), and 10% (by weight) Exact SLX-9090 (metallocene ethylene-olefin copolymer compatabilizer) with 1% by weight Drapex 4.4 (tall oil), 1% by weight Moldwhiz GHT-INT (saturated and unsaturated fatty esters with modified organic acid derivatives as a mold release), and 1% by weight Antifoam 1400 (silicone). The mixture was then blended with 20% dry crumb rubber mix. The blend was then compounded on a single screw one-inch extruder at temperatures ranging from 320° F. to 380° F. The resulting pellets were then molded on a 30-ton injection-molding machine into 3.25 mm thick disks and allowed to cure for 24 hours. The disks were then conditioned at −29° C. in a scientific freezer for 24 hours. The disks were then tested on Gardner impact machine. The disks passed at 200 in-lbs.

The next example was formulated for a low durometer application.

To produce this material, 25% crumb rubber was blended with 5% Exact SLX-9090 (metallocene ethylene-olefin copolymer used as a compatabilizer), 2% Polybond 3200 maleinated polyethylene coupling agent, a liquid mixture of 1% Drapex 4.4 (tall oil), 1% Moldwhiz GHT-INT (saturated and unsaturated fatty esters with modified organic acid derivatives), 1% Antifoam 1400 (silicone), and 10% Benzoflex 9-88 (dipropylene glycol dibenzoate, an aromatic ester plasticizer) were combined and also blended with a mixture of 55% SEBS (Styrene Ethylene Butylene Styrene, a styrenic blocked polymer). The blend was then compounded on a single crew one-inch extruder at temperatures ranging from 260° F. to 330° F. The resulting pellets were then molded on a 30-ton injection-molding machine into 3.25 mm thick disks and allowed to cure for 24 hours. The durometer was then determined to be at a 40 shore "A."

Next a sample critical for heat stability, ultraviolet (UV) stability, and Flame rating in a high Flex Modulus product was compounded. 10% Crumb rubber was combined with 2% Polybond 3200 (maleinated polyethylene), 0.5% Antimonty Oxide (as a flame retardant synergist), 4% Bis (2,3-Dibromopropyl ether) of tetrabromobisphenol A (as a flame retardant), and 0.25% Narugard 76 (Octadecyl,3,5,-di-tert-butyl 4-hydroxyhydrocinnamare as a hindered phenolic and as UV and heat stabilizer), and further combined with 1% Drapex 4.4 (tall oil), 1% Moldwhiz GHT-INT (saturated and unsaturated fatty esters with modified organic acid derivatives), 1% Antifoam 1400 (silicone), and 0.25% Narugard PHR (Tris (mono-nonylphenyl) phospite with 1% triisopropanolamine as a UV and heat stabilizer). 10% calcium carbonate (can also use talc or mica) as a stiffener, 5% Exact SLX-9090 (metallocene ethylene-olefin copolymer, used as a compatabilizer), and 65% homopolymer polypropylene were also added. The blend was then compounded on a single screw one-inch extruder at temperatures ranging from 330° F. to 410° F. The resulting pellets were then molded on a 30-ton injection-molding machine into 3.25 mm-thick disks and allowed to cure for 48 hours. The resulting disks were tested and found to have UV stability and be heat stable at 200° C. and passed a Fire rating of V2 (industry standard rating test).

Another sample was also designed to increase the fire rating from V2 to V0. 10% Crumb rubber was combined with 2% Polybind 3200 (maleinated polyethylene as a coupling agent), 0.5% Antimonty Oxide (flame retardant synergist), 12% decabromodiphenyl oxide (as flame retardant), and 0.25% Narugard 76 (Octadecyl,3,5,-di-tert-butyl 4-hydroxyhydrocinnamate, (hindered phenolic for use as an UV and heat stabilizer), and further combined with 1% Drapex 4.4 (tall oil), 1% Moldwhiz GHT-INT (saturated and unsaturated fatty esters with modified organic acid derivatives), 1% Antifoam 1400 (silicone), 0.25% Narugard PHR (tris (mono-nonylphenyl) phospite with 1% triisopropanolamine for use as an UV and heat stabilizer) and added to a mixture of 10% calcium carbonate (as filler/stiffener), 7% Exact SLX-9090 (metallocene (ethylene-olefin copolymer compatabilizer) and 55% homopolymer polypropylene. The blend was then compounded on a single screw one-inch extruder at temperatures ranging from 330° F. to 410° F. The resulting pellets were then molded on a 30-ton injection-molding machine into 3.25 mm-thick plaques and allowed to cure for 48 hours. The plaques passed V0 rating.

Another sample was for sheet material that could be thermoformed and had tear strength and sound deadening properties. For this sample, 50% crumb rubber was combined with 2% Polybind 3200 (maleinated polyethylene, a coupling agent), 0.5% irganox 1010 (tetrakis [methylene (3,5-di(tert)-butyl-4-hydroxyhydrocinnamate)] methane, as an antioxidant), 1% Drapex 4.4 (tall oil), 1% Moldwhiz GHT-INT (saturated and unsaturated fatty esters with modified organic acid derivatives for mold release), and 1% Antifoam 1400 (silicone) with 17.8% EVA and 26.7% Exact SLX-9090 (metallocene (ethylene-olefin copolymer, used as a compatabilizer). The blend was then compounded on a single screw one-inch extruder at temperatures ranging from 330° F. to 410° F. into 12" wide, 0.25" thick sheet. The sheet was then tested for thermoformability. It was found that this material can be thermoformed, its specific gravity was determined at 0.98 g/cm$^3$. This specific gravity is a lower weight density than the standard product that has a specific gravity of 1.8 g/cm$^3$ and otherwise has similar acoustic properties. The material was then tested for sound deadening capabilities using an industry standard 1.8 g/cm$^3$ barium-filled material as a control and the sound deadening capacity was found to exceed the barium-filled material. This resin was also compounded on a single screw one-inch extruder at temperatures ranging from 330° F. to 410° F. into pellets. The resulting pellets were then molded on a 30-ton injection-molding machine into 3.25 mm thick disks and allowed to cure for 24 hours. Tests were repeated showing the same results, better sound deadening, 0.98 g.cm$^3$ density, and improved tear strength.

The next sample was for a medium durometer good tear strength and abrasion resistant molded handle. 47.5% crumb rubber was mixed with 2% Polybind 3200 (maleinated polyethylene), 0.5% irganox 1010 (Tetrakis [methylene (3,5-di(tert)-butyl-4-hydroxyhydrocinnamate)] methane), 1% Drapex 4.4 (tall oil), 1% Moldwhiz GHT-INT (saturated and unsaturated fatty esters with modified organic acid derivatives), 1% Antifoam 1400 (silicone), and added to 47% Exact SLX-9090 (metallocene (ethylene-olefin copolymer). The resin was also compounded on a single screw one-inch extruder at temperatures ranging from 310° F. to 360° F. into pellets. The resulting pellets were then molded on a 30-ton injection-molding machine into 3.25 mm thick disks and allowed to cure for 24 hours. A 65 shore "A" material was obtained.

The next sample was for a powder coating. 25% crumb rubber was mixed with 4% maleinated polyethylene (as coupling agent), 0.5% irganox 1010 (Tetrakis [methylene (3,5-di(tert)-butyl-4-hydroxyhydrocinnamate)]methane), 1% Antifoam 1400 (silicone), 1% Moldwhiz (saturated and unsaturated fatty esters with modified organic acid derivatives), 1% Drapez 4.4 (tall oil) (lubricant), and blended with 7.5% Exact 3040 (metallocene (ethylene-olefin copolymer)), and 60% primacor (Ethylene Acrylic Acid Copolymer) (plastic). The blend was then compounded on a one-inch extruder at temperatures ranging from 200° F. to 280° F. The compounded pellets were further processed by cryogenic grinding to a point where the ground pellets passed through an 80-mesh sieve at a 100% rate. A common steel 3×5 plate was sand blasted to a 0.0035 profile. The powder was flame applied to the metal test sample. Sample was subjected to 100/hrs in a salt fog cabinet for corrosion and passed with no migration and maintained adhesion to the metal strata. A-40F gravelometer test was performed and the coating showed no signs of cracks or chips.

The next sample was to pass a fogging test. 10% crumb rubber was combined with 2% Polybond 3200 (maleinated polyethylene) 0.25% Narugard 76 (Octadecyl,3,5,-di-tert-butyl 4-hydroxyhydrocinnamate as UV and heat stabilizer), 1% Drapex 4.4 (tall oil), 1% Moldwhiz GHT-INT (saturated and unsaturated fatty esters with modified organic acid derivatives), 1% Antifoam 1400 (silicone), 0.25% Naurgard PHR (Tris (mono-nonylphenyl) phosphite with 1% triisopropanolamine as a UV and heat stabilizer), 2% Antifogging agent (glycerol monooleate), 0.15% 500P10 smell agent, 10% calcium carbonate (can also use talc or mica), 10% Exact SLX 9090 (metallocene (ethylene-olefin copolymer), and 62.35% copolymer polypropylene. The blend was then compounded on a single crew one-inch extruder at temperatures ranging from 330° F. to 410° F. The resulting pellets were then molded on a 30-ton injection-molding machine into 3.25 mm thick disks and allowed to cure for 48 hours. The resulting disks were then tested for fogging according to the Society of Automotive Engineers ("SAE") test method J1756 and fogging was eliminated and refractive index of 94 was reported. Smell was greatly reduced in the final molded product.

The present invention broadens the use of a dry liquid concentrate formula expanding on prior art beyond utilization of tall oil as a bonding agent and lubricant. The invention incorporates other processing aides and additives including flame-retardants, plasticizing agents, coupling agents, UV stabilizers, heat stabilizers, antioxidants, antifoaming agents, antifogging agents, and smell additives. Another key element of the invention is the use of metallocene as a compatabilizer conjunctively with crumb rubber in these products. The present invention broadens the scope of utilization of post-vulcanized rubber as a resource for mass manufacture.

Although only a few exemplary embodiments of the present invention have been described in detail above, those skilled in the art will readily appreciate that numerous modifications are to the exemplary embodiments are possible without materially departing from the novel teachings and advantages of this invention. Accordingly, all such modifications are intended to be included within the scope of this invention as defined in the following numbered claims.

What is claimed is:

1. A dry liquid concentrate composition, comprising:
   at least 40% by weight of a polypropylene copolymer;
   at least 10% by weight of polypropylene/ethylene-propylene terpolymer blend in which the rubber is crosslinked in the presence of the polypropylene;
   at least 11% by weight of a low density polyethylene;
   at least 0.5% by weight of an epoxidized tall oil;
   at least 0.5% by weight of a mixture of saturated and unsaturated fatty esters
   at least 0.5% by weight of silicone; and
   at least 20% by weight of a dry crumb rubber.

2. A dry liquid concentrate composition, comprising a blend of:
   at least 20% by weight of a crumb rubber, at least 5% by weight of a metallocene ethylene-olefin copolymer, at least 2% by weight of a maleinated polyethylene, at least 1% by weight of an epoxidized tall oil, at least 1% by weight of a mixture of saturated and unsaturated fatty esters, at least 0.5% by weight of silicone, and at least 10% by weight of dipropyleneglycol dibenzoate; and
   at least 50% by weight of styrene ethylene butylenes styrene.

3. A dry liquid concentrate composition, comprising a blend of:
   a crumb rubber, a maleinated polyethylene, a flame retardant, a flame retardant synergist, an ultraviolet light stabilizer, and a heat stabilizer;
   an epoxidized tall oil;
   a mixture of saturated and unsaturated fatty esters;
   calcium carbonate;
   a metallocene ethylene-olefin copolymer; and
   a polypropylene homopolymer.

* * * * *